Sept. 15, 1931.  W. D. SEAL  1,823,215
ELECTRIC LAWN MOWER AND HEDGE TRIMMER
Filed Sept. 21, 1929  2 Sheets-Sheet 1

Sept. 15, 1931.  W. D. SEAL  1,823,215
ELECTRIC LAWN MOWER AND HEDGE TRIMMER
Filed Sept. 21, 1929  2 Sheets-Sheet 2

Inventor:
Wm D Seal
By Monroe E Miller
Attorney.

Patented Sept. 15, 1931

1,823,215

UNITED STATES PATENT OFFICE

WILLIAM D. SEAL, OF DES ARC, MISSOURI

ELECTRIC LAWN MOWER AND HEDGE TRIMMER

Application filed September 21, 1929. Serial No. 394,226.

The present invention relates to lawn mowers and hedge trimmers, and aims to provide a novel and improved machine of that kind.

Another object of the invention is the provision of a novel electrically-driven lawn mower or hedge trimmer which is convenient and practical in use.

A further object is the provision of a novel carriage for the electric motor and cutter driven thereby.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
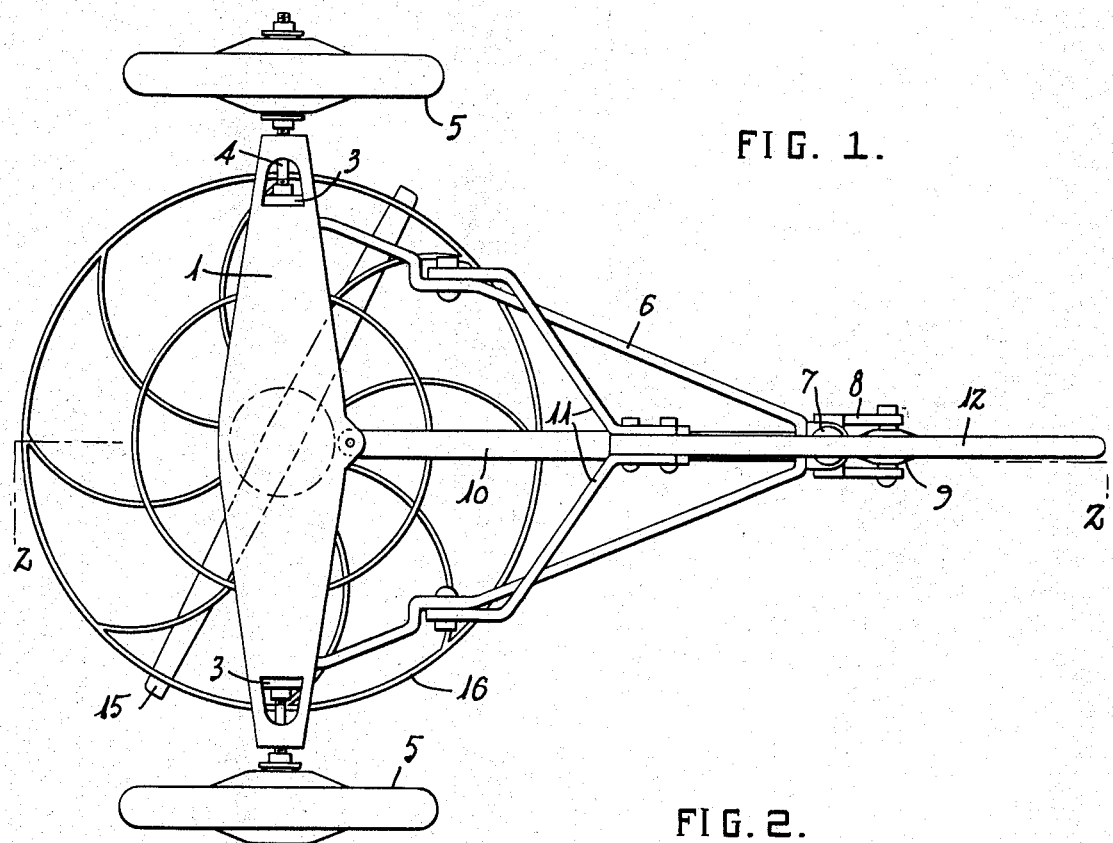
Figure 1 is a plan view of the improved machine.
Figure 2:
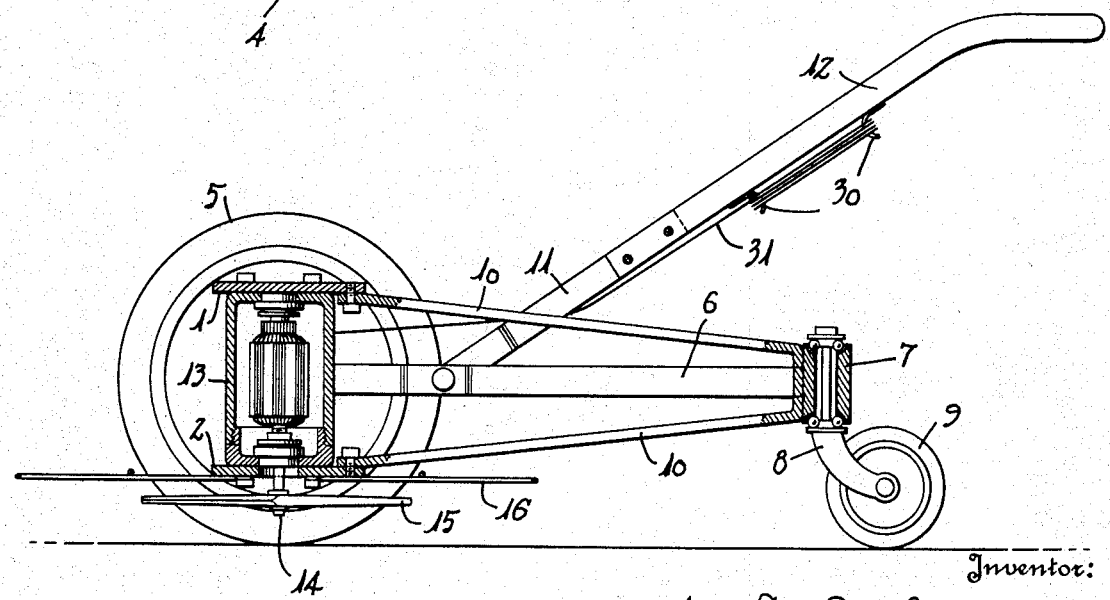
Fig. 2 is a vertical section on the line 2—2 of Fig. 1.
Figure 3:
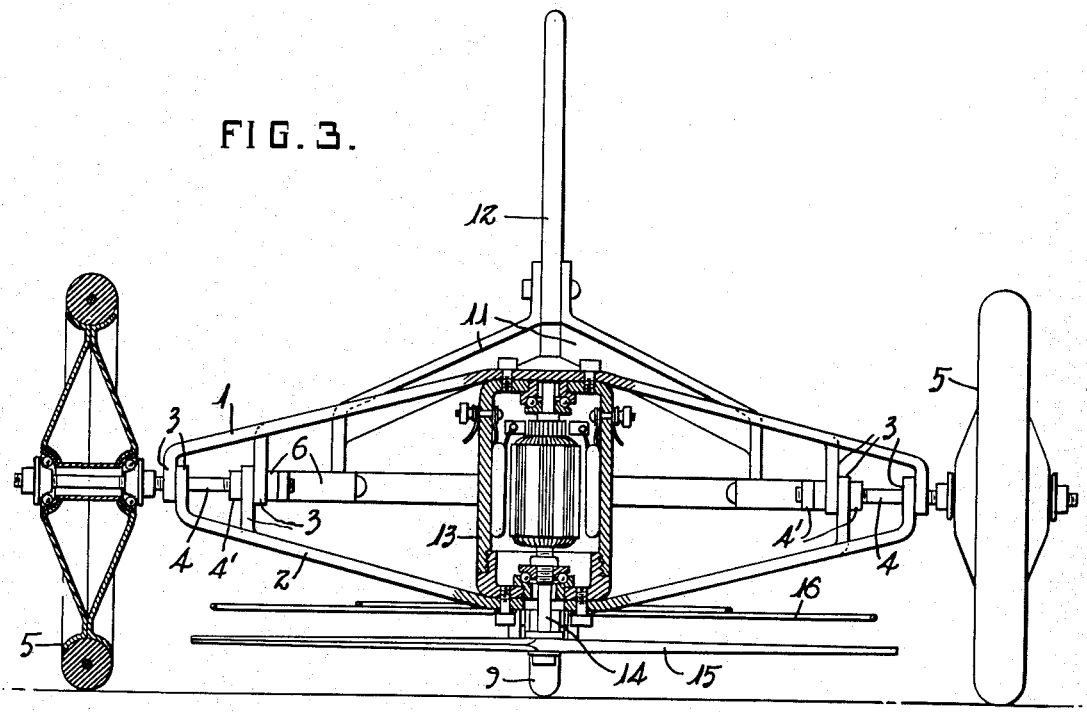
Fig. 3 is a front view of the machine, portions being shown in section.

The carriage comprises upper and lower transverse plates 1 and 2 which have overlapping ears 3 at the terminals thereof, the intermediate portions of said plates being offset away from one another. Spindles 4 extend through the ears 3 to fasten the plates 1 and 2 together, and said spindles protrude beyond the ends of the plates and have wheels 5 mounted for rotation thereon, preferably by means of ball bearings.

The frame comprises a V-shaped bar 6 having its ends engaging the spindles 4, and nuts 4 are threaded on said spindles to clamp the inner ears 3 and bars 6 together and to secure the spindles in place. A vertical bearing 7 is secured to the bend of the bar 6 in rear of the plates 1 and 2, said bar 6 extending rearwardly, and a caster fork 8 is mounted for rotation in the bearing 7, preferably by roller bearings. A caster wheel 9 is mounted for rotation in the fork 8, and with the wheels 5 provides a three-point wheel support for the frame or carriage, permitting the carriage to be readily steered or guided. Brace bars 10 connect the bearing 7 and plates 1 and 2. Bars 11 are pivoted to the bar 6 and converge together and are secured to a handle 12 for conveniently moving the machine about.

An electric motor 13 is disposed between and secured to the intermediate portions of the plates 1 and 2, and its armature shaft 14 extends downwardly through the lower plate 2 and has secured thereto the cutter blades 15 which move in a horizontal plane below a wire or other suitable guard 16 secured to the plate 2.

The blades 15 have sharp forward edges so as to cut the grass and weeds with a "sickle" action, the cutter being rotated at a high speed by the electric motor.

Figure 4:
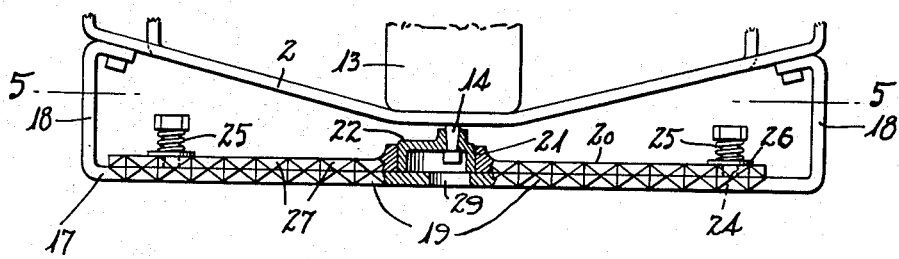
Fig. 4 is a front view illustrating a modified form of cutting means.
Figure 5:
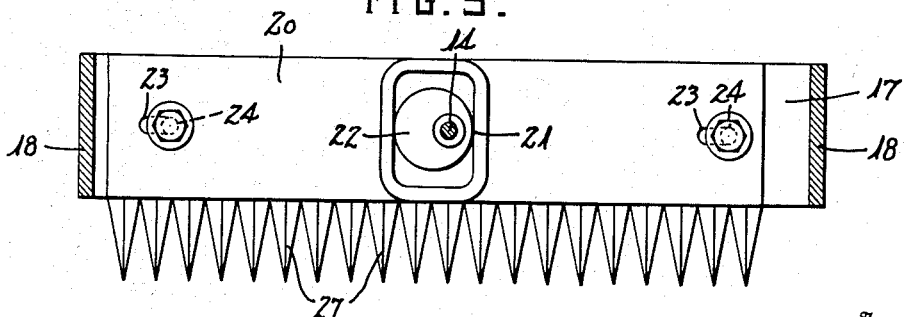
Fig. 5 is a section on the line 5—5 of Fig. 4.

Figs. 4 and 5 illustrate a mowing machine type of cutting means, including a lower stationary cutter bar 17 having terminal portions 18 extending upwardly and secured to the plate 2, and provided with forwardly extending teeth 19. A reciprocatory cutter bar 20 is mounted on the bar 17 and has an opening 21 receiving an eccentric 22 on the armature shaft 14 so as to reciprocate the bar 20. Said bar 20 has slots 23 receiving studs 24 secured to the bar 17, and springs 25 are confined between heads or nuts on said studs and washers 26 bearing on the bar 20 to hold said bar 20 snugly on the bar 17. The cutter bar 20 has forwardly extending teeth 27 moving with a shearing action over the teeth 19, for cutting the grass. The bar 17 has an opening 28 below the armature shaft 14 for access to the securing means on said armature shaft which fastens the eccentric 22 thereon.

The handle 12 has members 30 thereon around which the electric wire cord 31 may be wound, said cord leading from the motor 13 and being connected, in the operation of the machine, to an electric lamp socket or other source of electrical current.

The machine affords convenient and practical means for mowing lawns, and may also be used for trimming hedges.

Having thus described the invention, what is claimed as new is:

1. A machine of the character described comprising upper and lower transverse plates having downwardly and upwardly extending portions, respectively at their terminals which overlap one another, spindles extending through said overlapping portions, wheels mounted on said spindles, an electric motor secured to and between said plates, and cutting means below said plates driven by said motor.

2. A machine according to claim 1 and including a bearing, a caster mounted in said bearing, and bars secured to said bearing and to said plates and spindles.

3. A machine according to claim 1 and including a bearing, a caster mounted in said bearing, a V-shaped bar secured at its bend to said bearing and having its terminals engaging said spindles, and a handle connected to said bar.

In testimony whereof I hereunto affix my signature.

WM. D. SEAL.